United States Patent [19]

Naito

[11] Patent Number: 5,214,339
[45] Date of Patent: May 25, 1993

[54] CIRCUIT AND METHOD OF DRIVING AN ULTRASONIC MOTOR TO METHOD FOR DRIVING AN ULTRASONIC MOTOR

[75] Inventor: Masafumi Naito, Kanagawa, Japan

[73] Assignee: Asmo Co., Ltd., Japan

[21] Appl. No.: 725,005

[22] Filed: Jul. 2, 1991

[30] Foreign Application Priority Data

Jul. 4, 1990 [JP] Japan .................. 2-175358

[51] Int. Cl.⁵ .............................. H01L 41/08
[52] U.S. Cl. ............................ 310/316; 310/323; 318/116
[58] Field of Search ............... 318/116; 310/323, 316

[56] References Cited

U.S. PATENT DOCUMENTS

| | | | |
|---|---|---|---|
| 3,889,166 | 6/1975 | Scurlock | 318/116 |
| 4,275,363 | 6/1981 | Mishiro et al. | 318/116 |
| 4,727,276 | 2/1988 | Izukawa et al. | 310/316 |
| 4,853,579 | 8/1989 | Kawasaki et al. | 310/323 |
| 4,914,337 | 4/1990 | Takagi | 310/316 |
| 5,061,882 | 10/1991 | Takagi | 310/316 |

FOREIGN PATENT DOCUMENTS 61-221586 10/1986 Japan .
61-295884 12/1986 Japan .
62-203575 9/1987 Japan .
   648876 1/1989 Japan .
 1298967 1/1989 Japan .

*Primary Examiner*—Mark O. Budd
*Assistant Examiner*—Thomas M. Dougherty
*Attorney, Agent, or Firm*—Stetina and Brunda

[57] ABSTRACT

A device and method are provided for driving an ultrasonic motor. The motor's initial start drive frequency is set higher than the resonant frequency of the motor and an initial target drive frequency is set lower than the resonant frequency. A drive signal is then applied to a piezoelectric element on the stator in order to rotate the rotor. The frequency of the drive signals is then swept from the start frequency to the target frequency. Abnormal vibrations of the rotor that occur during sweeping of the drive frequency are detected by a monitor electrode mounted on the stator. Upon the detection of an abnormal vibration, the target frequency is reset to equal the drive frequency at which the abnormal vibration was detected. The drive frequency is then reset to a reset start frequency that is higher than the reset target frequency. Thereafter, the drive frequency sweeping step is repeated. This provides a high output from the motor without generating noise.

3 Claims, 6 Drawing Sheets

CIRCUIT AND METHOD OF DRIVING AN ULTRASONIC MOTOR TO METHOD FOR DRIVING AN ULTRASONIC MOTOR

This application claims the priority of Japanese Patent Application No. 2-175358 filed on Jul. 4, 1990 which is incorporated herein by reference.

BACKGROUND OF THE INVENTION

1. Field of the Invention

The present invention relates to a circuit and a method for driving an ultrasonic motor. More particularly, this invention pertains to a circuit and a method for controlling a voltage to be applied to the ultrasonic motor's piezoelectric element.

2. Description of the Related Art

One conventional ultrasonic motor design includes a stator provided with a piezoelectric element divided into two portions, and a rotor supported on and pressed against the stator such that the rotor is rotatable. In this ultrasonic motor, high-frequency voltages of different phases are applied to the individual divided portions of the piezoelectric element. The voltages are applied such that they generate a progressive wave on the surface of the stator to thereby rotate the rotor. To drive the ultrasonic motor, the frequency of the applied voltage should be equal to the resonant frequency of the motor. The resonant frequency fluctuates with changes in the environmental conditions, such as temperature, and with changes in the load acting on the output shaft of the motor. In order to stably drive the motor regardless of this frequency fluctuation, it is known to provide the ultrasonic motor with an automatic follow-up circuit as disclosed in Japanese Unexamined Patent Publication No. Sho 62-203575.

As shown in FIG. 8, the ultrasonic motor disclosed in this Japanese patent document has a monitor electrode 42 provided on a piezoelectric element 41 to monitor the voltage induced by the excitation of the piezoelectric element 41. After this monitor signal is smoothed by a smoothing circuit 43, its DC component is applied to a comparator 44. The comparator 44 compares the DC component of the monitor signal with a predetermined reference voltage and outputs a predetermined voltage in accordance with the comparison result. A voltage controlled oscillator (VCO) 45 controls the frequency of a source voltage in accordance with the output voltage of the comparator 44. The source voltage is applied via a phase shifter (PS) 46 and a power amplifier 47 to the piezoelectric element 41.

The output of the motor and the drive frequency have the relationship as shown in FIG. 9, which shows that a high output is obtained in the proximity of the resonant frequency where noise is likely to occur.

Therefore, in the circuit shown in FIG. 8, when the reference voltage of the comparator 44 is set high to provide a high output, the frequency of the source voltage may fall into a frequency range where noise occurs due to the environmental and load based frequency fluctuations. In this case, noise will occur. If the reference voltage is set low to prevent the generation of noise under any environmental condition, a high output will not be attained. In short, the conventional ultrasonic motor has the shortcoming that a high output cannot be provided without generating noise.

SUMMARY OF THE INVENTION

It is therefore an object of the present invention to provide an ultrasonic motor driving method which can drive the motor with a high output while preventing noise from occurring.

To achieve the foregoing and other objects and in accordance with the purpose of one aspect of the present invention, a method is provided for driving an ultrasonic motor. The ultrasonic motor includes a stator, a rotor rotatably mounted on the stator, and a piezoelectric element for driving the rotor. The piezoelectric element is arranged to receive drive signals of different phases in order to cause rotation of the rotor. A monitor electrode is provided to output a monitor signal indicative of vibrations in the rotor. The method includes the steps of setting an initial start drive frequency that is higher than the resonant frequency of the motor and an initial target drive frequency that is lower than the resonant frequency. The frequency of the drive signals is then swept from the start frequency to the target frequency. Abnormal vibrations of the rotor that occur during sweeping of the drive frequency are then detected based on the monitor signal. Upon the detection of an abnormal vibration, the target frequency is reset to equal the drive frequency at which the abnormal vibration was detected. The drive frequency is then reset to a reset start frequency that is higher than then reset target frequency. Thereafter, the drive frequency sweeping step is repeated.

In one preferred aspect of the invention a reference frequency that is lower than the resonant frequency and different from an initial target frequency is also set. The drive frequency is then reset to a reset start frequency each time the frequency of the drive signals reaches the reference frequency during a particular frequency sweep. The number of times that the reference frequency is reached is counted and the sweep speed is adjusted (decreased) on the basis of the number of times that the reference frequency has been reached.

In another preferred aspect of the invention, in the event that an abnormal vibration is detected in the rotor, the sweep speed is adjusted (decreased) in accordance with decreases in the difference between the target frequency and the frequency at which the abnormal vibration was detected.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiment in conjunction with the accompanying drawings in which:

DETAILED DESCRIPTION OF THE PREFERRED EMBODIMENT

A preferred embodiment of the present invention will now be described referring to the accompanying drawings.

Figure 1:
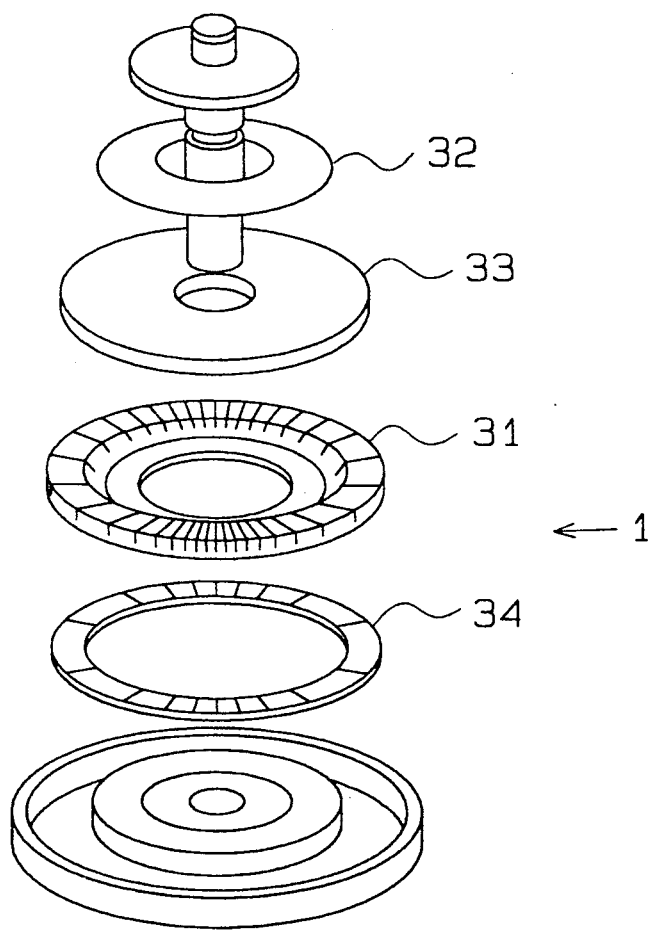
FIG. 1 is an exploded perspective view illustrating the structure of an ultrasonic motor for use in one embodiment of the present invention.
Figure 2:
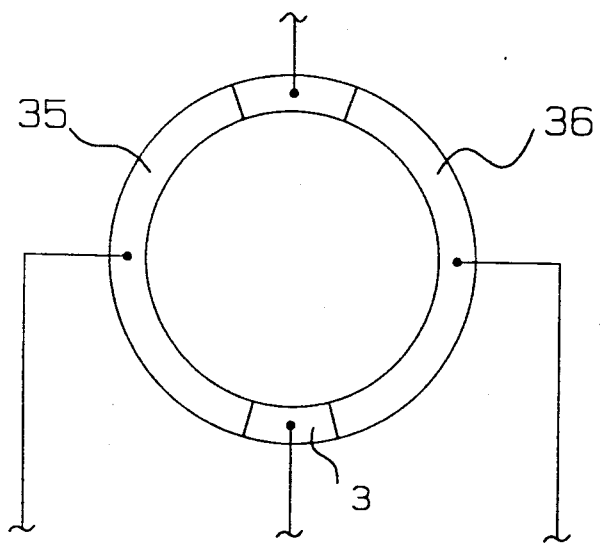
FIG. 2 is a plan view showing a piezoelectric element of the ultrasonic motor.

An ultrasonic motor 1 according to this embodiment includes a stator 31 of a resilient material, and a rotor 33 rotatably supported on the stator 31 as shown in FIG. 1. The rotor 33 is pressed against the stator 31 by a spring 32. A ring-shaped piezoelectric element 34 is provided in close contact with the bottom of the stator 31. As shown in FIG. 2, the piezoelectric element 34 is divided into two portions 35 and 36 between which drive electrodes 2 (see FIG. 3) are provided. A monitor electrode 3 is also provided between the divided piezoelectric portions 35 and 36. The monitor electrode 3 detects abnormal vibrations of the rotor 33 and outputs a monitor signal.

Applying high-frequency voltages of difference phases to the divided portions 35 and 36 cause the entire piezoelectric element 34 to oscillate. In turn, this oscillation produces a progressive wave that rotates the rotor 33.

Figure 3:
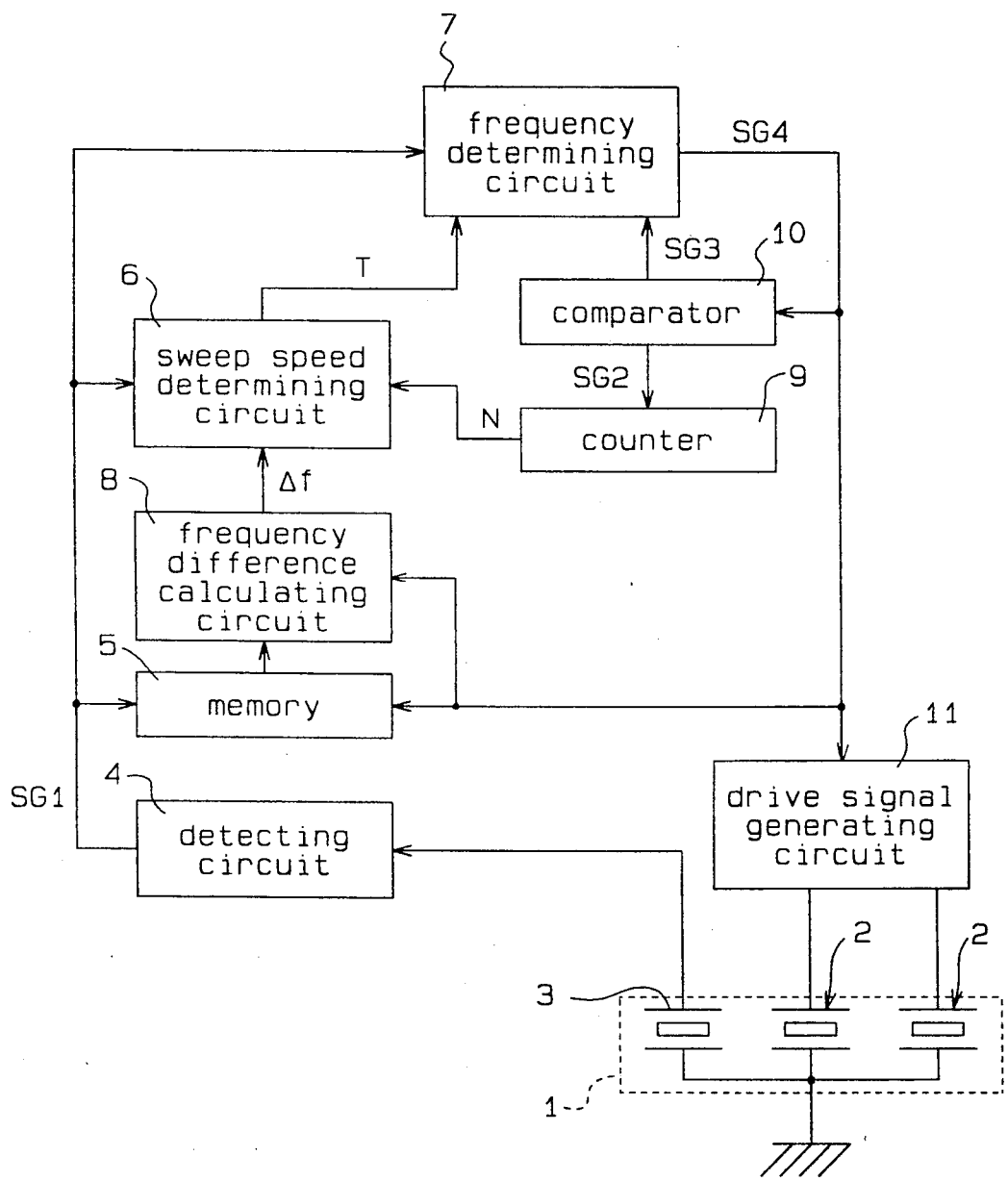
FIG. 3 is a block diagram of a circuit for driving the ultrasonic motor.

The ultrasonic motor according to this embodiment has a driving apparatus as shown in FIG. 3, which includes a drive signal generating circuit 11 to apply a drive voltage of a predetermined frequency to each drive electrode 2. The driving apparatus also has a detecting circuit 4 to detect noises that originate from abnormal vibrations of the rotor 33. The detecting circuit 4 outputs a noise detection signal SG1 upon the detection of excess noise based upon the monitor signal. It is noted that the noise has a frequency that is beyond the audible range.

A frequency memory 5 is connected to the drive signal generating circuit 11 and detecting circuit 4. The frequency memory 5 stores the current drive frequency when a noise detection signal SG1 is received. A frequency difference calculating circuit 8 then computes the difference between the drive frequency at a time that noise is detected and the target drive frequency.

A sweep speed determining circuit 6 operates in response to the noise detection signal SG1. This circuit 6 decreases the sweep speed T of the drive frequency in response to decreases in the frequency difference Δf determined by the frequency difference calculating circuit 8.

In another portion of the device, a frequency comparator 10 compares the present drive frequency with a predetermined reference frequency that is lower than the resonant frequency of the motor. When the drive frequency reaches the reference frequency, the comparator 10 outputs predetermined detection signals SG2 and SG3. A counter 9 stores a number N which is indicative of the number of times the drive frequency has been swept to reach the reference frequency. The counter is incremented by the output signal SG2. The sweep speed determining circuit 6 is further arranged to slow the sweep speed T of the drive frequency in accordance with an increase in this number N. Thus, the sweep speed can be adjusted each time the drive frequency is reset. This is done in two ways. First, when the reference frequency is encountered before noise is detected, the sweep speed is set based on the number of times that the reference frequency has been obtained. Second, when noise is actually detected, the sweep speed is adjusted based on difference between the target frequency and the drive frequencies at the time noise is detected.

Figure 7:
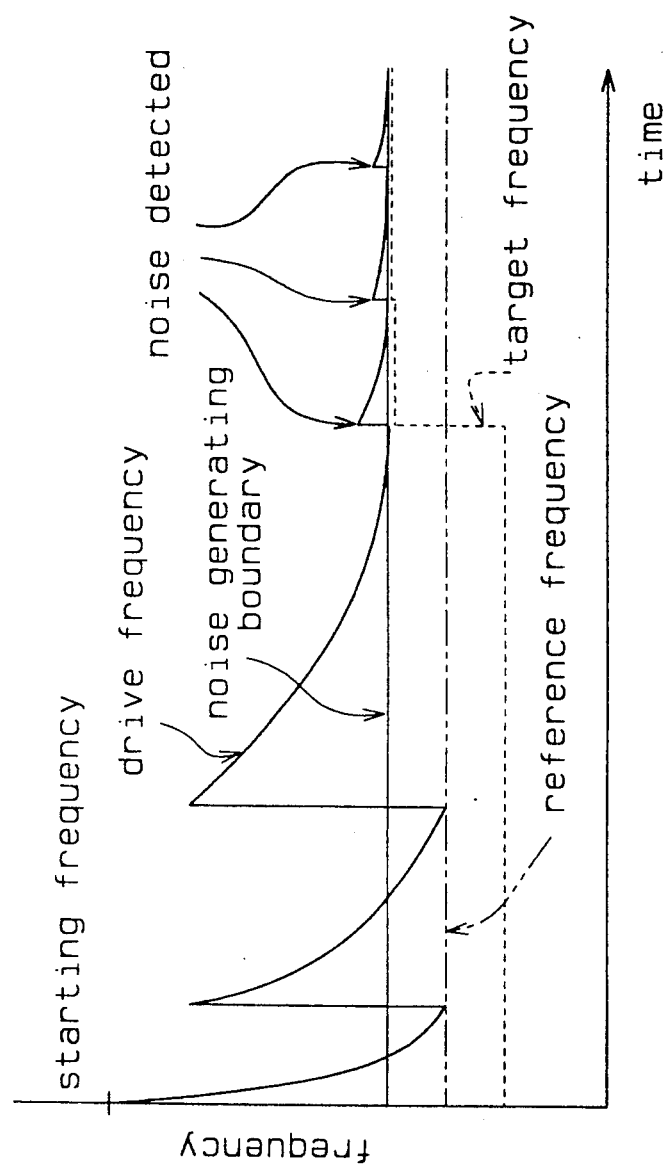
FIG. 7 is a graph showing in enlargement this relationship between the drive frequency and time.
Figure 8:
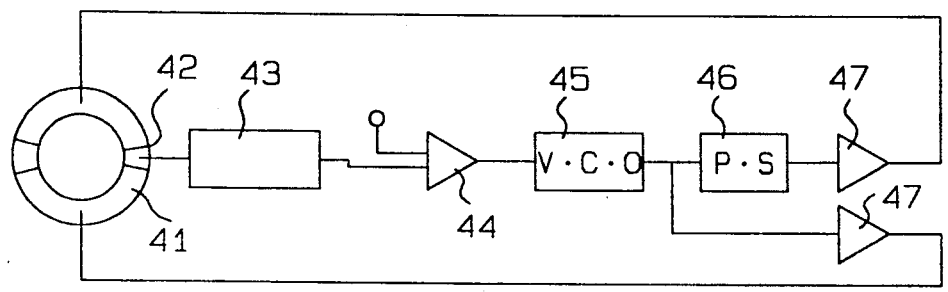
FIG. 8 is a block diagram illustrating a conventional circuit for driving an ultrasonic motor.
Figure 9:
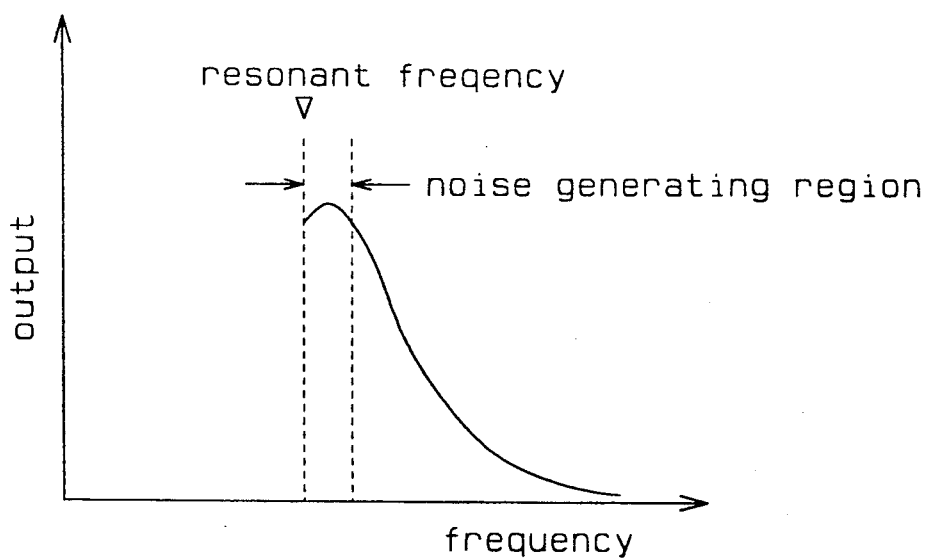
FIG. 9 is a graph showing the relationship between the motor output and the drive frequency.

Upon reception of the signal SG3 from the comparator 10, a frequency determining circuit 7 outputs a frequency control signal SG4 to the drive frequency generating circuit 11 to sweep the drive frequency to a target frequency or the reference frequency in accordance with the sweep speed T. As shown in FIG. 7, upon reception of the noise detection signal SG1, this circuit 7 sets the target drive frequency to a value higher than the reference frequency so that the target drive frequency becomes nearly equal to the frequency at the noise generating boundary. The drive signal generating circuit 11 applies drive voltages to the individual electrodes 2 while sweeping the frequency in response to the frequency control signal SG4.

The following will discuss how the speed of sweeping the drive frequency toward the low frequency side from the high frequency side influences the motor output.

Figure 4:
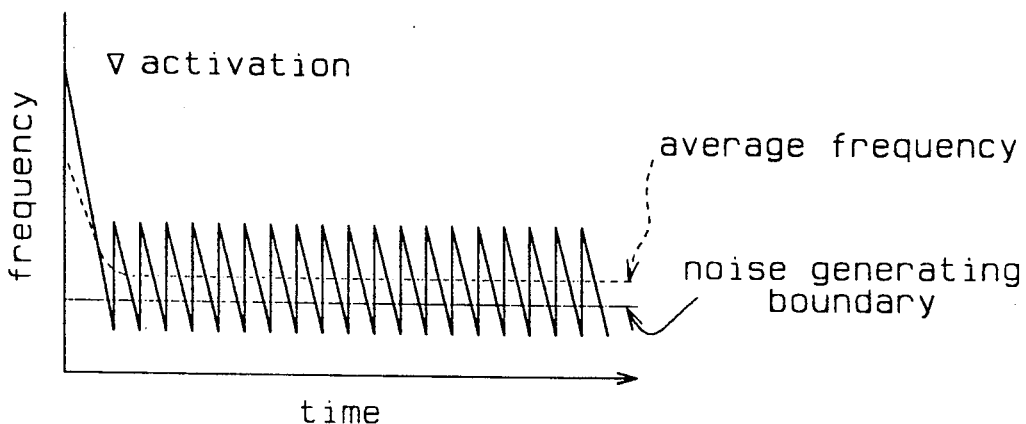
FIG. 4 is a graph showing the relationship between a drive frequency and time in the case where the speed of sweeping the drive frequency is high.

When the sweep speed is set high, the motor will be activated quickly as shown in FIG. 4. This high sweep speed setting, however, will result in a relatively large frequency differential between the noise generating boundary and the frequency at which the drive frequency is reset. In other words, since the sweep speed is fast, the delay in shifting the drive frequency back to the reset frequency after encountering the noise generating boundary is likely to permit a substantial amount of noise to actually occur. At such high sweep speeds, the circuit reacts to encountering the noise generating boundary after the frequency has dropped well before the noise generating boundary. The higher the sweep speed, the further the frequency can drop below the noise generating boundary before resetting of the frequency sweep occurs. The average value of the drive frequency is therefore significantly higher than the frequency boundary at which noise occurs, thus resulting in smaller motor output.

Figure 5:
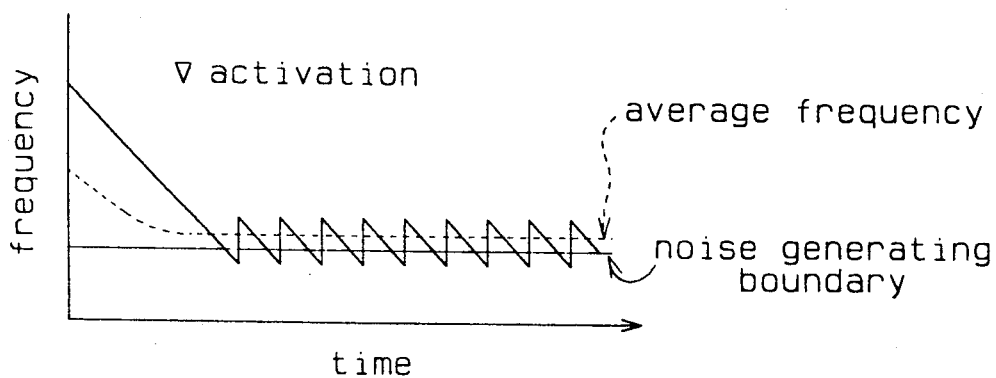
FIG. 5 is a graph showing the relationship between the drive frequency and time in the case where the sweep speed is low.

When the sweep speed is set low, on the other hand, the drive frequency can be shifted high shortly after the drive frequency reaches a noise generating boundary. At the same time, the amount of shift toward the high frequency side can be reduced. The average drive frequency can therefore be set very close to the noise generating boundary, thereby increasing the motor output. However, as can be seen in FIG. 5, such an arrangement has the drawback of a slower activating time.

Figure 6:
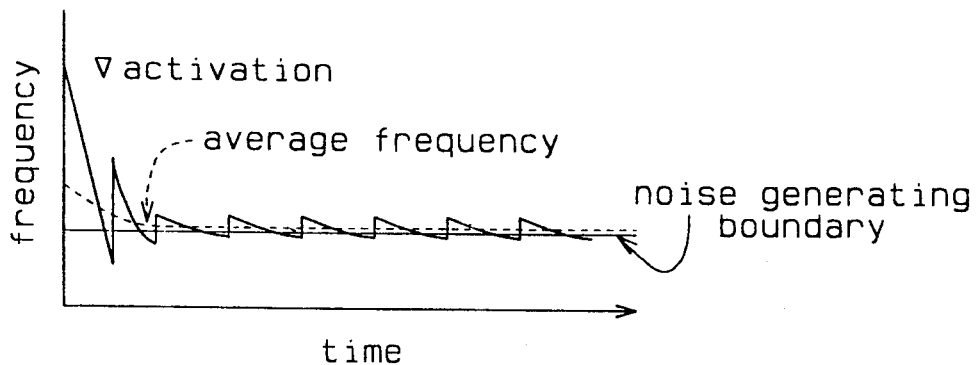
FIG. 6 is a graph showing the relationship between the drive frequency and time according to an embodiment of this invention.

According to the described embodiment of the present invention, before the motor is activated, the reference frequency is set lower than the noise generating boundary (resonant frequency) and the target frequency is set even lower than the reference frequency, as shown in FIGS. 6 and 7. Under these conditions, the drive signal generating circuit 11 applies the drive voltages to the individual electrodes 2 while sweeping the frequency from the start frequency (a high frequency) to the target frequency (a lower frequency).

When the drive frequency being swept reaches the reference frequency, the comparator 10 outputs the detection signals SG2 and SG3. The counter 9 is incremented in response to the signal SG2 in order to count the number of times that the reference frequency is reached, N. The sweep speed determining circuit 6 determines the sweep speed T in accordance with the number N, while the frequency determining circuit 7 outputs the frequency control signal SG4 in accordance with the signal SG3 and the sweep speed T. In response to the signal SG4, the drive signal generating circuit 11 shifts the drive frequency to a reset value that is sufficiently higher than the noise generating region. Then, the circuit 11 applies the voltages to the drive electrodes 2 while again sweeping the drive frequency toward the low frequency side from the high frequency side in accordance with the sweep speed T.

When the number N increases, for example, when N becomes "2" as in this embodiment, the sweep speed T is slowed. When the detecting circuit 4 detects noise occurrence based on the monitor signal while the drive frequency is being swept in accordance with the sweep speed T, the frequency determining circuit 7 resets the target frequency to a value nearly equal to the frequency at the noise generating boundary in response to the noise detection signal SG1. Then, the sweeping of the drive frequency starts again after the drive frequency is shifted to the high frequency side. It is apparent from FIG. 7 that the amount of shift in this case is set smaller than the shift in the previous case.

The sweep speed determining circuit 6 operates in response to the noise detection signal SG1 and sets the sweep speed T to slow down in accordance with a decrease in the frequency difference Δf between the drive frequency being swept and the target frequency. When the drive frequency is swept in accordance with the sweep speed T and reaches the target frequency again, the above-described frequency shifting and sweeping will be repeated.

As voltages whose frequencies are controlled in the above manner are applied to the drive electrodes 2, the ultrasonic motor is driven by a voltage of an average frequency extremely close to but different from the boundary frequency at which noise occurs. This stably provides the maximum motor output without generating noise.

In addition, if comparison is made between the drive frequency and the reference frequency, the monitor signal can be surely detected in accordance with a delay of the abnormal vibration of the rotor. Further, since the motor can be driven with the drive frequency controlled while detecting the frequency of the noise generating boundary, a stable maximum motor output can be acquired even when the frequency of the noise generating boundary is changed due to a change in environmental conditions.

What is claimed is:

1. A method of driving an ultrasonic motor having a stator, a piezoelectric element carried by the stator, the piezoelectric element that is divided into two portions, a rotor that is rotatably mounted on the stator such that the rotor is driven by applying drive signals of different phases to the two portions of the piezoelectric element, and a monitor electrode for outputting a monitor signal indicative of the vibration of the rotor, the method comprising the steps of:

setting a start drive frequency higher than a resonant frequency of the motor;
   setting a target frequency for the drive signals that is lower than the resonant frequency of the motor;
   sweeping the frequency of the drive signals from the start frequency to the target frequency;
   detecting abnormal vibrations of the rotor occurring during sweeping of the drive frequency based on the monitor signal, wherein in the event that an abnormal vibration is detected, the target frequency is reset to equal the actual drive frequency at the time the abnormal vibration was detected, and the actual drive frequency is reset to a reset start frequency that is higher than the reset target frequency; and
   repeating the drive frequency sweeping step.

2. A method according to claim 1, further comprising the step of:

setting a reference frequency that is lower than the resonant frequency and different from the initial target frequency;
   resetting the drive frequency to a reset start frequency each time the frequency of the drive signals reaches the reference frequency during a particular frequency sweep;
   counting a number of times that the reference frequency is reached during sweeping; and
   repeating the sweeping step, wherein a sweep speed for sweeping the frequency of the drive signals is decreased in accordance with the number of times the reference frequency is reached.

3. A method according to claim 1, wherein a sweep speed for sweeping the frequency of the drive signals is decreased in accordance with decreases in a difference between the reset target frequency and the reset start frequency.

* * * * *